M. B. DISKIN.
RESILIENT WHEEL.
APPLICATION FILED JAN. 23, 1919. RENEWED MAR. 30, 1920.

1,353,731.

Patented Sept. 21, 1920.
2 SHEETS—SHEET 1.

WITNESSES
Geo. W. Naylor
Geo. L. Beeler

INVENTOR.
M. B. Diskin
BY Munn & Co.
ATTORNEYS

M. B. DISKIN.
RESILIENT WHEEL.
APPLICATION FILED JAN. 23, 1919. RENEWED MAR. 30, 1920.
1,353,731.
Patented Sept. 21, 1920.
2 SHEETS—SHEET 2.
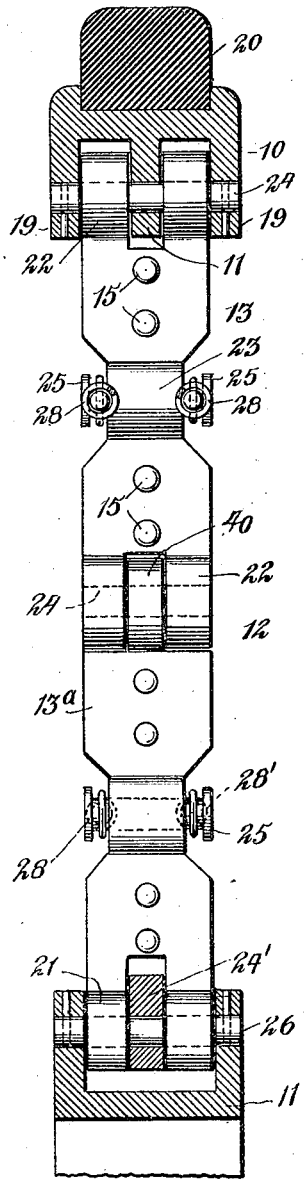
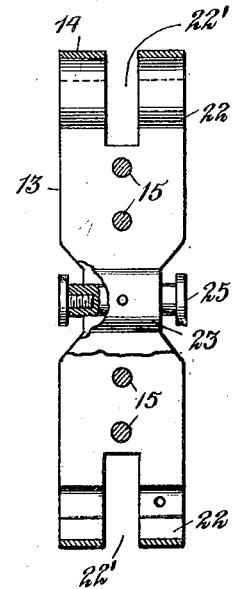
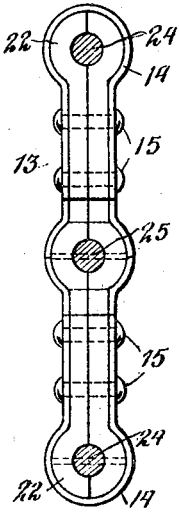
INVENTOR
M. B. Diskin

UNITED STATES PATENT OFFICE.

MOSES B. DISKIN, OF NEW YORK, N. Y.

RESILIENT WHEEL.

1,353,731.  Specification of Letters Patent.  Patented Sept. 21, 1920.

Application filed January 23, 1919, Serial No. 272,667.  Renewed March 30, 1920.  Serial No. 370,047.

*To all whom it may concern:*

Be it known that I, Moses B. Diskin, a citizen of the United States, and a resident of the city of New York, borough of Manhattan, in the county and State of New York, have invented a new and Improved Resilient Wheel, of which the following is a full, clear, and exact description.

This invention relates to vehicle wheels and has particular reference to wheels having rigid rims and flexible or resilient spokes or connections between the rim and the hub.

Among the objects of the invention is to provide a wheel for automobiles, bicycles, motorcycles, or other road vehicles which shall possess the desired resiliency for the comfort of the occupants of the vehicle and for practical purposes, and yet shall not be subjected to the dangers or inconveniences incident to the use of pneumatic tires or the like.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to accompanying drawings, in which like reference characters designate the same parts in the several views, and in which Figure 1 is a side elevation showing the general construction and appearance of my invention.

Fig. 2 is a vertical sectional detail on the line 2—2 of Fig. 1.

Fig. 3 is a detail view of one of the outer spoke links, parts of the same being in section.

Fig. 4 is an edge view of the same member shown in Fig. 3.

Figure 1:
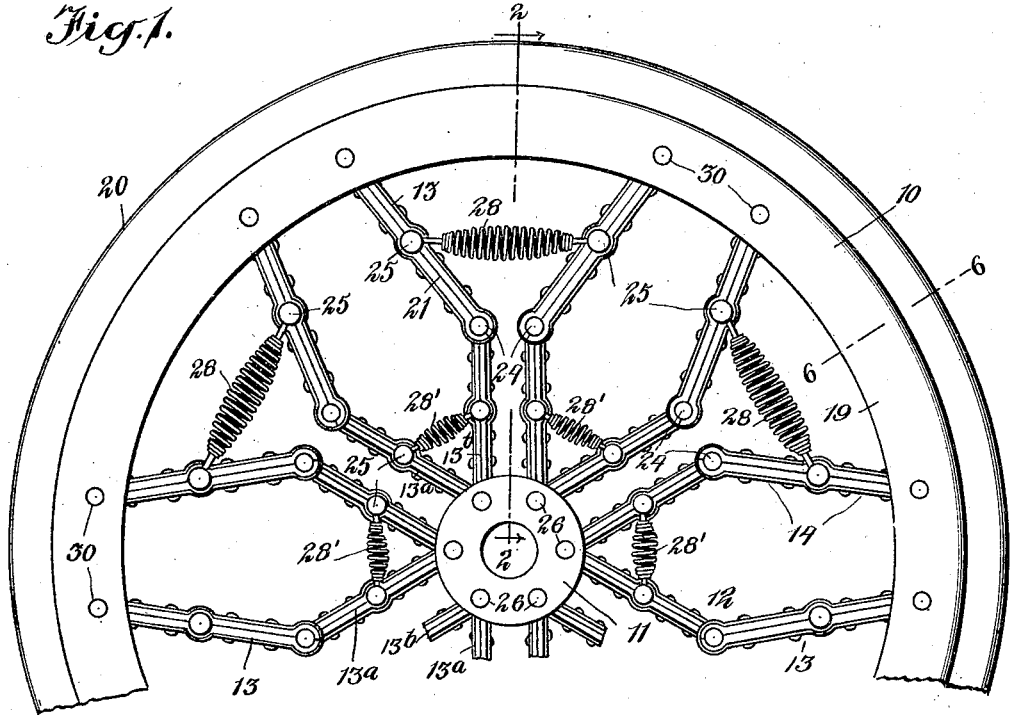

Referring now more specifically to the drawings I show a wheel comprising a rim 10, a hub 11, and a series of spokes 12 extending between the rim and the hub and pivotally attached to the same. Each spoke 12 as a whole comprises an outer link 13 and an inner link 13$^a$ or 13$^b$. In a general way all of the links are similar in construction but are distinguished by several characteristics soon to appear. Each link is made up preferably from two similar halves formed from sheet metal stamped or otherwise made to coöperate with each other and form upper and lower bosses 22 and an intermediate or central boss 23, each of the pairs of bosses having concavities providing for a transverse pivot pin 24 and a central anchorage pin 25. Each link is completed and the two halves thereof are bound permanently together in assembled position by means of straps 14 of generally U-form that embrace the end bosses 22 and extend to any desired distance toward or over the central boss 23. These straps are held in place and thereby the two halves of the link are held together by fasteners 15 such as rivets passing through the straps and the link portion. Each boss 22 is centrally notched or recessed at 22′ to receive a correspondingly shaped attachment member such as the central flange or web 17 of the rim 10 at the outer end of a tongue 40 of the hub link at the inner end of the link 13. Each of the hub links 13$^a$ or 13$^b$ is provided with a tongue 40, but at their inner ends the hub links are different from each other, the former having a fork or pivot boss 21 and the latter having a tongue member 24′ which projects between the two portions of the boss 21 as shown at the lower portion of Fig. 2. Each link 13 is articulated at its inner end to a link 13$^a$ or 13$^b$ by means of a pin 24, and the links 13$^a$ and 13$^b$ are connected in pairs to the hub 11 by means of a pin 26 for each pair.

Figure 6:
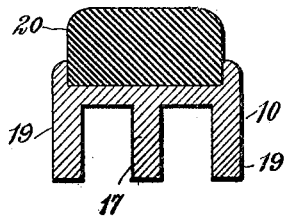
Fig. 6 is a sectional detail on the line 6—6 of Fig. 1.

The rim 10 shown in cross section in Fig. 6 comprises in addition to the central flange or web 17 a pair of outer webs or flanges 19. The outer face of the rim is provided with a seat for a tire 20 of solid rubber or other suitable material. The hub 11 likewise is provided with a plurality of spaced parallel webs or flanges 26 between which the inner ends 21 and 22 of the hub links 13$^a$ and 13$^b$ are pivotally connected in pairs.

Figure 5:
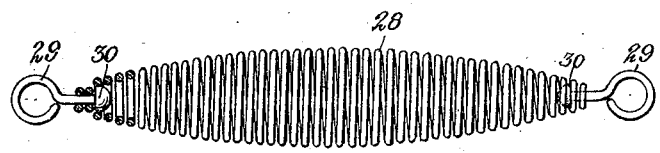
Fig. 5 is a detail view of a preferred form of spring connection between pairs of links of adjacent spokes.

Whereas in every resilient wheel there is the tendency for the hub and rim to occupy eccentric positions with respect to each other as a result of the load supported upon the hub, inequalities or obstructions in the roadway, or other conditions, I provide means to limit this eccentric movement and the bending or flexing of the spokes 12 at the joints between the inner and outer links, and to this end I provide any suitable number, form, or arrangement of coil springs 28, or their equivalent, but preferably of the form shown in detail in Fig. 5, each spring being of double conical spiral form and having connected in each end thereof a hook 29 having a head 30 within the coil and grip of the spring. In the normal form or position of the wheel as shown in Fig. 1 with the hub concentric with the rim, the outer spoke links 13 are disposed in pairs converging toward each other at their inner ends. Each pair of these links being connected by a pair of springs 28 arranged on opposite sides of the pair of links have their hooks 29 engaging over the ends of the anchor pins 25 of said pair of links. (See Figs. 1 and 2.) In other words the normal tendency of these springs is to draw the inner ends of the links 13 toward each other. At the top of the wheel when the hub is depressed under a load or shock the spokes are straightened like toggle links and so this strain upon the spokes tending to straighten them causes the elongation of the springs 28, an action which naturally is resisted by the contractile tendency of the springs. The links 13$^a$ and 13$^b$ adjacent to the hub are substantially parallel to each other and are similarly connected by resilient members 28' similar to the springs 28, the hooks 29 of which engage over central pins similar to the pins 25 above described, but the springs 28' of the hub links are arranged in staggered relation to the springs 28 or in other words while one spring 28 lies between two adjacent spokes, the springs 28' each extend between one of these spokes and the next adjacent spoke of the next pair of spokes. Therefore, the tendency of the hub links to approach each other at the lower half of the wheel as a result of the depression of the hub is resisted by the contractile tendency of the springs 28'. It will be noted that the normal form of each spoke is such that one link 13 is at an angle to the link 13$^a$ or 13$^b$ articulated thereto so that there is no resistance, due to dead centers, inherent in the spokes preventing the flexing of the spokes and the eccentric movement of the wheel and rim with respect to each other. As noted in Figs. 2 and 3 the spoke links may be recessed laterally so as to provide a sort of housing for the springs within the planes bounding the lateral edges of the spokes. I do not wish, however, to be unnecessarily restricted as to the design of these parts.

I claim:

1. In a resilient wheel, the combination of a hub, a rim normally concentric therewith, a plurality of spokes extending between the hub and the rim and pivotally connected thereto, each spoke comprising two rigid links pivoted together and the spokes being arranged in pairs, the outer links of each pair of spokes being convergent toward the hub while the inner links of the same pair are substantially parallel to each other, a coil spring connected to the outer links of each pair of spokes and tending to increase the convergence thereof, and a coil spring extending from each inner link to the next adjacent inner link of the next pair of inner links, the springs aforesaid being arranged in staggered relation throughout the entire series of spokes.

2. In a resilient wheel, the combination with a hub and rim, of a series of spokes extending from the hub to the rim and pivotally connected thereto, each spoke comprising inner and outer links pivotally connected together and normally arranged at an angle to each other, spring means connected to the outer link of each spoke and tending normally to draw the link and spoke in one direction, and spring means connected to the opposite side of the other link of the same spoke and tending to draw the spoke in the opposite direction.

MOSES B. DISKIN.